US008245493B2

(12) United States Patent  (10) Patent No.: US 8,245,493 B2
Minto                     (45) Date of Patent:    Aug. 21, 2012

(54) POWER PLANT AND CONTROL METHOD (75) Inventor: Karl Dean Minto, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/217,727

(22) Filed: Aug. 25, 2011

(65) Prior Publication Data

US 2012/0023960 A1    Feb. 2, 2012

(51) Int. Cl.
    F02C 7/08    (2006.01)
(52) U.S. Cl. .................... 60/39.52; 60/39.281
(58) Field of Classification Search .......... 60/39.5, 60/39.52, 59.53, 772, 39.281, 776; 356/326, 356/327; 92/5 R; 91/1
See application file for complete search history.

(56) References Cited

U.S. PATENT DOCUMENTS

| | | | |
|---|---|---|---|
| 2,621,475 A * | 12/1952 | Loy | .................... 60/774 |
| 2,646,663 A | 7/1953 | Sedille | |
| 3,866,411 A | 2/1975 | Marion et al. | |
| 3,949,548 A | 4/1976 | Lockwood, Jr. | |
| 4,271,664 A | 6/1981 | Earnest | |
| 4,313,300 A | 2/1982 | Wilkes et al. | |
| 4,330,038 A | 5/1982 | Soukup et al. | |
| 4,434,613 A | 3/1984 | Stahl | |
| 4,492,085 A | 1/1985 | Stahl et al. | |
| 4,528,811 A | 7/1985 | Stahl | |
| 5,564,896 A | 10/1996 | Beeck et al. | |
| 5,595,059 A | 1/1997 | Huber et al. | |
| 5,724,805 A | 3/1998 | Golomb et al. | |
| 5,794,431 A | 8/1998 | Utamura et al. | |
| 5,809,768 A | 9/1998 | Uematsu et al. | |
| 6,050,082 A | 4/2000 | Leonard et al. | |
| 6,105,362 A | 8/2000 | Ohtomo | |
| 6,202,400 B1 | 3/2001 | Utamura et al. | |
| 6,256,976 B1 | 7/2001 | Kataoka et al. | |
| 6,269,624 B1 | 8/2001 | Frutschi et al. | |
| 6,289,666 B1 | 9/2001 | Ginter | |

(Continued)

FOREIGN PATENT DOCUMENTS

EP    1731833 A1    12/2006

(Continued)

OTHER PUBLICATIONS

U.S. Appl. No. 13/217,550, filed Aug. 25, 2011.

(Continued)

*Primary Examiner* — Phutthiwat Wongwian
(74) *Attorney, Agent, or Firm* — Sutherland Asbill & Brennan LLP (57) ABSTRACT

Ambient air is compressed into a compressed ambient gas flow with a main air compressor. The compressed ambient gas flow having a compressed ambient gas flow rate is delivered to a turbine combustor and mixed with a fuel stream having a fuel stream flow rate and a portion of a recirculated gas flow to form a combustible mixture. The combustible mixture is burned and forms the recirculated gas flow that drives a turbine. The recirculated gas flow is recirculated from the turbine to the turbine compressor using a recirculation loop. At least one emission level is measured by at least a first emission sensor in the recirculated gas flow and at least a first control signal is generated. The fuel stream flow rate is adjusted based on the at least a first control signal to achieve substantially stoichiometric combustion.

20 Claims, 4 Drawing Sheets

U.S. PATENT DOCUMENTS

| | | |
|---|---|---|
| 6,338,240 B1 | 1/2002 | Endo et al. |
| 6,363,709 B2 | 4/2002 | Kataoka et al. |
| 6,430,915 B1 | 8/2002 | Wiant et al. |
| 6,622,470 B2 | 9/2003 | Viteri et al. |
| 6,637,183 B2 | 10/2003 | Viteri et al. |
| 6,848,249 B2 | 2/2005 | Coleman et al. |
| 6,851,266 B2 | 2/2005 | Liebig |
| 6,868,677 B2 | 3/2005 | Viteri et al. |
| 6,910,335 B2 | 6/2005 | Viteri et al. |
| 7,007,487 B2* | 3/2006 | Belokon et al. .............. 60/777 |
| 7,032,388 B2* | 4/2006 | Healy ............................ 60/772 |
| 7,089,743 B2 | 8/2006 | Frutschi et al. |
| 7,127,898 B2 | 10/2006 | Healy |
| 7,383,686 B2 | 6/2008 | Aycock et al. |
| 7,490,472 B2* | 2/2009 | Lynghjem et al. ............ 60/772 |
| 7,503,178 B2* | 3/2009 | Bucker et al. .................. 60/774 |
| 7,516,609 B2 | 4/2009 | Agnew |
| 7,726,114 B2 | 6/2010 | Evulet |
| 7,739,864 B2* | 6/2010 | Finkenrath et al. .......... 60/39.52 |
| 7,895,822 B2* | 3/2011 | Hoffmann et al. ............ 60/39.5 |
| 2003/0051481 A1 | 3/2003 | Priestley et al. |
| 2004/0011057 A1 | 1/2004 | Huber |
| 2004/0134194 A1 | 7/2004 | Roby et al. |
| 2005/0028529 A1 | 2/2005 | Bartlett et al. |
| 2005/0150229 A1 | 7/2005 | Baer et al. |
| 2007/0006592 A1* | 1/2007 | Balan et al. .................... 60/772 |
| 2007/0034171 A1 | 2/2007 | Griffin et al. |
| 2007/0068167 A1 | 3/2007 | Patel et al. |
| 2007/0125063 A1 | 6/2007 | Evulat |
| 2007/0125064 A1 | 6/2007 | Sonoda |
| 2007/0125091 A1 | 6/2007 | Roby et al. |
| 2007/0220896 A1 | 9/2007 | Varatharajan et al. |
| 2008/0010967 A1 | 1/2008 | Griffin et al. |
| 2008/0104938 A1 | 5/2008 | Finkenrath et al. |
| 2008/0104939 A1 | 5/2008 | Hoffmann et al. |
| 2008/0120960 A1 | 5/2008 | Agnew |
| 2008/0309087 A1 | 12/2008 | Evulet et al. |
| 2009/0199566 A1 | 8/2009 | Lebas et al. |
| 2009/0218821 A1 | 9/2009 | Elkady et al. |
| 2009/0280003 A1* | 11/2009 | Schriner et al. ................ 415/13 |
| 2009/0284013 A1 | 11/2009 | Anand et al. |
| 2009/0301054 A1 | 12/2009 | Simpson et al. |
| 2010/0018218 A1 | 1/2010 | Riley et al. |
| 2010/0115960 A1 | 5/2010 | Brautsch et al. |
| 2010/0126181 A1* | 5/2010 | Ranasinghe et al. ............ 60/782 |
| 2010/0170218 A1 | 7/2010 | Eluripati et al. |
| 2010/0180565 A1* | 7/2010 | Draper .......................... 60/39.52 |
| 2011/0067408 A1* | 3/2011 | Maly et al. ....................... 60/772 |
| 2011/0138766 A1* | 6/2011 | Elkady et al. ................ 60/39.24 |
| 2011/0289898 A1* | 12/2011 | Hellat et al. .................. 60/39.52 |

FOREIGN PATENT DOCUMENTS

| | | |
|---|---|---|
| EP | 2078827 A1 | 7/2009 |
| EP | 2206959 A2 | 7/2010 |

OTHER PUBLICATIONS

U.S. Appl. No. 13/217,630, filed Aug. 25, 2011, Non-Final Office Action mailed Jan. 30, 2012, Response to Non-Final Office Action filed Apr. 30, 2012, Final Office Action mailed May 21, 2012.

U.S. Appl. No. 13/217,405, filed Aug. 25, 2011, Notice of Allowance mailed Apr. 11, 2012, Request for Continued Examination filed May 18, 2012.

U.S. Appl. No. 13/217,610, filed Aug. 25, 2011, Non-Final Office Action mailed Feb. 7, 2012, Response to Non-Final Office Action filed May 7, 2012.

U.S. Appl. No. 13/217,601, filed Aug. 25, 2011, Non-Final Office Action mailed Feb. 9, 2012, Response to Non-Final Office Action filed May 9, 2012, Notice of Allowance mailed May 18, 2012, Issue Notification mailed Jun. 6, 2012.

U.S. Appl. No. 13/217,646, filed Aug. 25, 2011, Non-Final Office Action mailed Jan. 31, 2012, Response to Non-Final Office Action filed Apr. 30, 2012.

U.S. Appl. No. 13/217,713, filed Aug. 25, 2011, Notice of Allowance mailed Feb. 2, 2012, Rule 312 Amendment filed Mar. 16, 2012, Request for Continued Examination filed Apr. 13, 2012.

U.S. Appl. No. 13/217,686, filed Aug. 25, 2011, Non-Final Office Action mailed Dec. 13, 2011, Response to Non-Final Office Action filed Mar. 5, 2012, Non-Final Office Action mailed Apr. 5, 2012.

U.S. Appl. No. 13/217,658, filed Aug. 25, 2011, Non-Final Office Action mailed Jan. 31, 2012, Response to Non-Final Office Action filed Apr. 30, 2012.

U.S. Appl. No. 13/217,359, filed Aug. 25, 2011, Non-Final Office Action mailed Feb. 10, 2012, Response to Non-Final Office Action filed Jun. 11, 2012.

Bandar Duraya Al-Anazi, "Enhanced Oil Recovery Techniques and Nitrogen Injection," CSEG Recorder, Oct. 2007, pp. 28-33.

Disclosure under 37 CFR 1.56 for U.S. Appl. No. 13/217,727, filed Jun. 29, 2012.

* cited by examiner

POWER PLANT AND CONTROL METHOD

BACKGROUND OF THE INVENTION

The subject matter of the present disclosure relates generally to the field of electric power plants, and more particularly to methods of operating and controlling stoichiometric exhaust gas recirculation turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

BRIEF DESCRIPTION OF THE INVENTION

In one aspect, a method for controlling a stoichiometric exhaust gas recirculation power plant is provided. Ambient air is compressed into a compressed ambient gas flow by at least one main air compressor. At least a first portion of the compressed ambient gas flow, with a compressed ambient gas flow rate, is delivered to a turbine combustor that is fluidly connected to the at least one main air compressor. A fuel stream, having a fuel stream flow rate, is delivered to the turbine combustor for mixing with the at least a first portion of the compressed ambient gas flow and with at least a first portion of a recirculated gas flow to form a combustible mixture. The combustible mixture is burned and thereby forms the recirculated gas flow and drives a turbine connected to a turbine compressor via a turbine shaft. The recirculated gas flow is recirculated from the turbine to the turbine compressor using a recirculation loop. At least one emission level is measured by at least a first emission sensor in the recirculated gas flow. The at least one emission level that is measured by the at least a first emission sensor is used to generate at least a first control signal. The fuel stream flow rate is adjusted based on the at least a first control signal to achieve substantially stoichiometric combustion.

In another aspect, a method for controlling at least one master train of a stoichiometric exhaust gas recirculation power plant is provided. Ambient air is compressed into a compressed ambient gas flow by at least one main air compressor. At least a first portion of the compressed ambient gas flow, with a master compressed ambient gas flow rate, is delivered to a master turbine combustor that is fluidly connected to the at least one main air compressor. A master fuel stream, having a mater fuel stream flow rate, is delivered to the master turbine combustor for mixing with the at least a first portion of the compressed ambient gas flow and with at least a first portion of a master recirculated gas flow to form a master combustible mixture. The master combustible mixture is burned and thereby forms the master recirculated gas flow and drives a master turbine connected to a master turbine compressor via a master turbine shaft. The master recirculated gas flow is recirculated from the master turbine to the master turbine compressor using a master recirculation loop. At least one master emission level is measured by at least a first master emission sensor in the master recirculated gas flow. The at least one master emission level that is measured by the at least a first master emission sensor is used to generate at least a first master control signal. The master fuel stream flow rate is adjusted based on the at least a first master control signal to achieve substantially stoichiometric combustion.

In yet another aspect, a stoichiometric exhaust gas recirculation power arrangement is provided. The power plant arrangement comprises at least one main air compressor for compressing ambient air into a compressed ambient gas flow and one or more gas turbine assemblies. Each gas turbine assembly comprises a turbine combustor, fluidly connected to the at least one main air compressor, for mixing at least a first portion of the compressed ambient gas flow, having a compressed ambient gas flow rate, with at least a first portion of a recirculated gas flow and a fuel stream, having a fuel stream flow rate, to form a combustible mixture and for burning the combustible mixture and forming the recirculated gas flow. Each gas turbine assembly further comprises a turbine connected to the turbine combustor and to a turbine shaft. The turbine is arranged to be driven by the recirculated gas flow from the turbine combustor. Each gas turbine assembly further comprises a turbine compressor, fluidly connected to the turbine combustor, and connected to the turbine shaft and arranged to be driven thereby. Each gas turbine assembly also comprises a recirculation loop for recirculating the recirculated low oxygen content gas flow from the turbine to the turbine compressor. Each gas turbine assembly additionally comprises a controller, configured to adjust the fuel stream flow rate to achieve substantially stoichiometric combustion, using at least a first control signal generated by a first emission sensor measuring at least one emission level in the recirculated gas flow.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume almost all of the oxygen in the air working fluid to produce a substantially oxygen-free exhaust stream. Such an exhaust stream may be more easily suited to emissions reductions using $NO_x$ catalysts. Additionally, such an exhaust stream may be better suited to post combustion carbon capture solutions due to the low oxygen concentrations. Furthermore, an essentially oxygen-free exhaust stream may be more easily suited to enhanced oil recovery applications.

A substantially oxygen-free exhaust stream from a gas turbine may be accomplished by stoichiometric burning in the combustion system. That is, the oxygen-containing fresh air supply may be matched to the fuel flow such that the combustion process operates substantially stoichiometrically.

A stoichiometric combustion reaction of methane and oxygen is illustrated below:

$$CH_4 + 2O_2 \rightarrow CO_2 + 2H_2O$$

Stoichiometric combustion may result in gas temperatures much too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be substantially oxygen-free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine will not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. In some situations, it may be necessary to discharge some of the air compressed by the auxiliary compressor to the atmosphere.

As discussed in detail below, embodiments of the presently disclosed subject matter may be used to control a power plant that is configured to minimize emissions by using as SEGR cycle that may enable substantially stoichiometric combustion reactions for power production. The SEGR gas turbine may be configured so as to provide a low oxygen content exhaust. This low oxygen content exhaust may be used with a $NO_x$ reduction catalyst to provide an exhaust stream that may also be substantially free of $NO_x$ contaminants. The exhaust stream may be applied to enhanced oil recovery applications, may be ideal for carbon capture and storage (CCS) processes, or may be useful in any process where a diluent is required with a low oxygen content. In some of the specific embodiments, the present technique includes using the SEGR cycle to provide low oxygen content streams of carbon dioxide, nitrogen, and/or water.

Power Plant Arrangements

Figure 1:
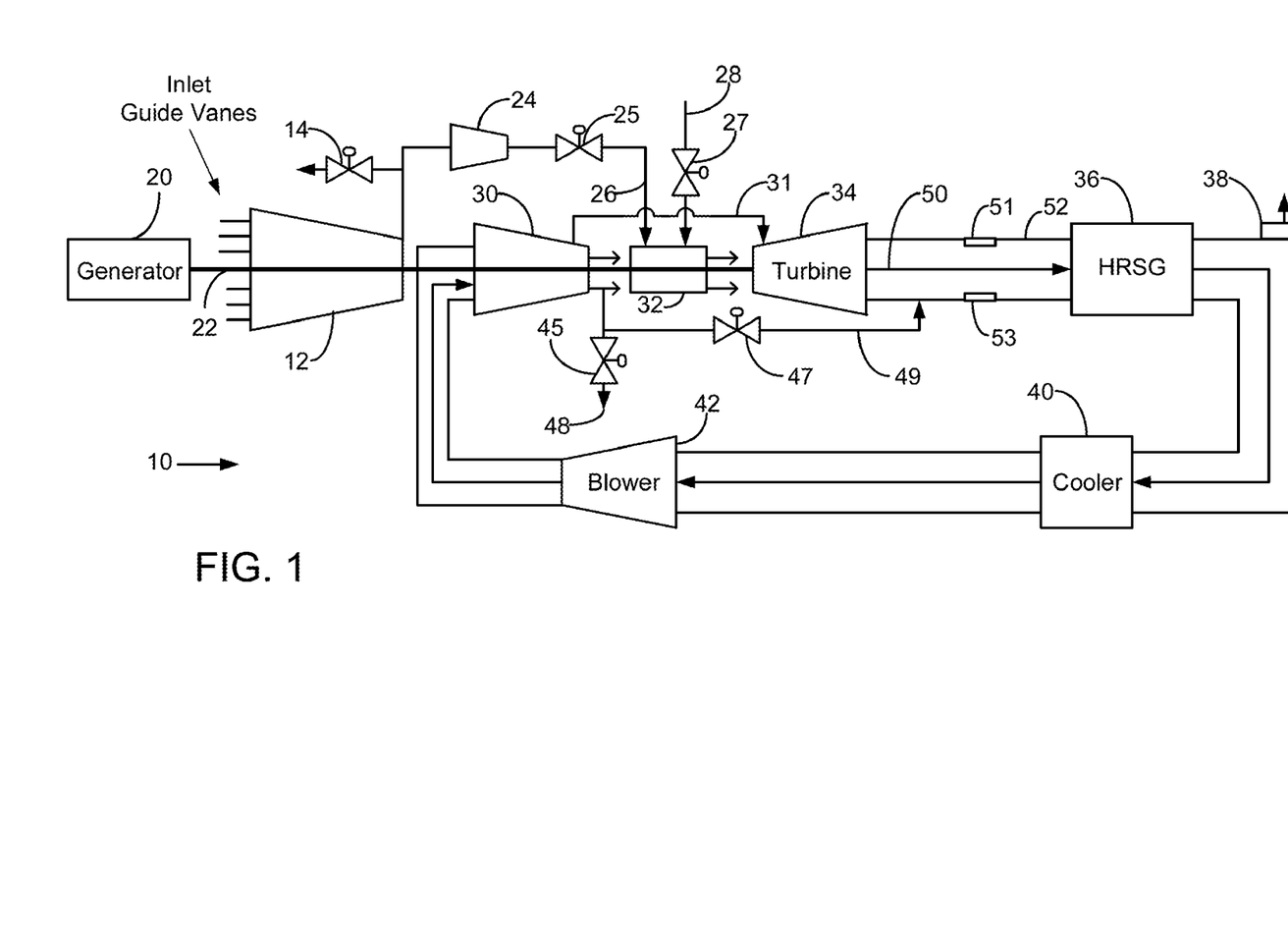
FIG. 1 is a diagrammatical illustration of an exemplary power plant arrangement 10 in accordance with an embodiment of the present invention.

Turning now to the drawings and referring first to FIG. 1 a power plant arrangement 10 is illustrated. The power plant arrangement 10 includes a main air compressor 12 for compressing ambient air into at least a first portion of a compressed ambient gas flow. The power plant arrangement 10 may include a turbine combustor 32 that may be fluidly connected to the main air compressor 12 via a turbine compressor bypass conduit 26. The flow of the at least a first portion of the compressed ambient gas flow to the turbine combustor 32 may be regulated to deliver the at least a first portion of the compressed ambient gas flow with a compressed ambient gas flow rate. An air injection valve 25 may also be used to control the delivery of the at least a first portion of the compressed ambient gas flow to the turbine combustor.

An excess portion, if any, of the at least a first portion of the compressed ambient gas flow may be vented to the atmosphere via a variable bleed valve 14. Such venting may be necessary, for instance, to prevent an overflow of air into the turbine compressor 32 or to prevent a buildup of backpressure into the main air compressor 12, thereby preventing a surge.

The turbine combustor 32 may be configured to receive the at least a first portion of the compressed ambient gas flow from the main air compressor 12, at least a first portion of a recirculated gas flow 50 from a turbine compressor 30, and a fuel stream 28, to form a combustible mixture and to burn the combustible mixture to generate the recirculated gas flow 50. In some embodiments, the fuel stream 28 may be regulated by a gas control valve 27 to deliver a fuel stream flow rate.

In addition, the power plant arrangement 10 may comprise a turbine 34 located downstream of the turbine combustor 32. The turbine 34 may be configured to expand the recirculated low oxygen content gas flow 50 and may drive an external load such as a turbine generator 20 via a turbine shaft 22 to generate electricity. In the illustrated embodiment 10, the main air compressor 12 and the turbine compressor 30 may be driven by the power generated by the turbine 34 via the turbine shaft 22.

In some embodiments, the main air compressor 12 may further comprise adjustable inlet guide vanes (IGVs) to control the flow of air into the main air compressor 12. The IGVs of the main air compressor may be used to regulate the compressed ambient gas flow rate and pressure that is delivered to the turbine combustor 32. In some embodiments, the turbine compressor 30 may further comprise IGVs to control the flow of air into the turbine compressor 30.

The operation of the power plant arrangement 10 may be monitored by one or more sensors detecting various conditions of the turbine 34, the turbine generator 20, and the recirculation loop 52. For example, temperature sensors may monitor the turbine compressor 30 discharge temperature, the turbine 34 exhaust gas temperature, and other temperature measurements of the recirculated gas flow through the recirculation loop 52. Pressure sensors may monitor static and dynamic pressure levels at the turbine compressor 30 inlet and outlet, at the turbine 34 exhaust, as well as at other locations in the recirculation loop 52. The sensors may also comprise flow sensors, speed sensors, flame detector sensors, valve position sensors, guide vane angle sensors, or the like that sense various parameters pertinent to the operation of the power plant arrangement 10.

The sensors may be linked to a controller. The controller may be a General Electric SPEEDTRONIC™ Gas Turbine Control System, such as is described in Rowen, W. I., "SPEEDTRONIC™ Mark V Gas Turbine Control System." GE-3658D, published by GE Industrial & Power Systems of Schenectady, N.Y. The controller may be a computer system having a processor that executes programs to control the operation of the gas turbine assembly using sensor inputs and instructions from human operators. The programs executed by the controller may include algorithms for regulating fuel flow to the turbine combustor 32 and the angle the IGVs of the main air compressor 12 and/or the turbine compressor 30. The commands generated by the controller cause a fuel controller on the gas turbine assembly, for example, adjust the gas control valve 27 to regulate the flow of fuel and actuators to adjust the angle of the IGVs on the main air compressor 12 and/or the turbine compressor 30.

The controller regulates the gas turbine assembly, in part, based on algorithms stored in computer memory of the controller. These algorithms enable the controller to maintain the $NO_x$ and CO emissions in the recirculated gas flow 50 to within certain defined limits, and to maintain the turbine combustor 32 firing temperature to within predefined temperature limits. In some embodiments, these algorithms may enable the controller to maintain a substantially stoichiometric combustion reaction in the turbine combustor 32.

The gas turbine assembly may further comprise one or more emission sensors in the recirculation loop 52. In some embodiments, a first emission sensor 51 may be used to measure at least a first emission level in the recirculated gas flow 50. In some embodiments, the at least a first emission level measured by the first emission sensor 51 may be used to generate at least a first control signal. The first emission sensor 51 may be connected to the controller, and the controller may be used to process the at least a first control signal. The fuel stream flow rate may then be adjusted based on the at least a first control signal to achieve substantially stoichiometric combustion. In some embodiments, the fuel stream flow rate may be adjusted using the gas control valve 27.

In some embodiments, the at least a first control signal may be used to adjust the compressed ambient gas flow rate into the turbine combustor 32. In some embodiments, the step of adjusting the compressed ambient gas flow rate may comprise adjusting a plurality of IGVs of the main air compressor 12. In other embodiments, the at least a first control signal may be used to adjust a plurality of IGVs of the turbine compressor 30.

In some embodiments, the first emission sensor 51 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the recirculated gas flow 50 and provide direct signals of same to the control system.

Figure 2:
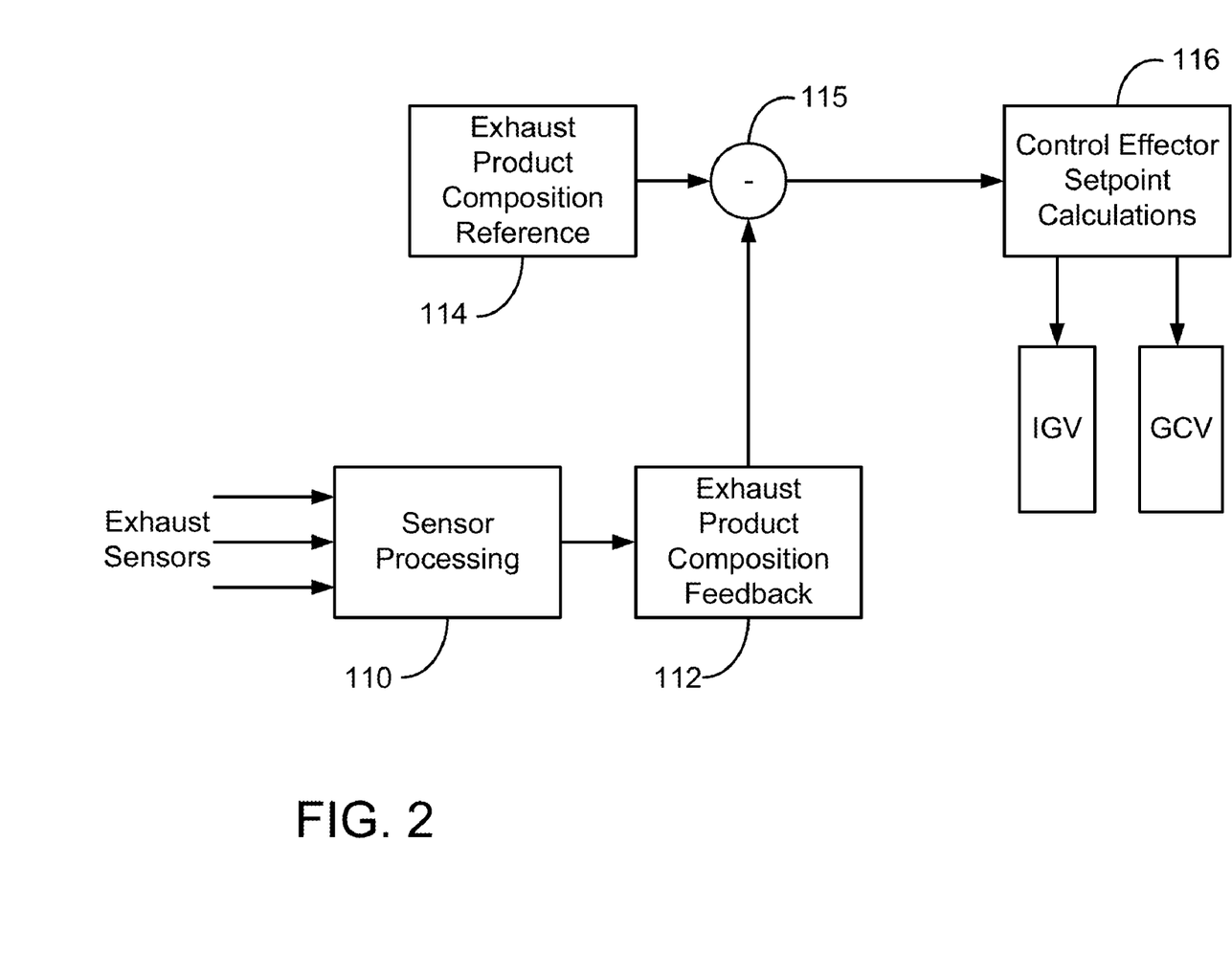
FIG. 2 is a high-level block diagram of a direct exhaust product control method in accordance with an embodiment of the present invention.

FIG. 2 shows a high-level block diagram of a direct exhaust product control method. One or more exhaust sensors provide input to a sensor processing unit 110 which produces an exhaust product composition feedback value 112. The exhaust product composition feedback value 112 is compared to a corresponding exhaust product composition reference 114 to generate a difference signal 115. The difference signal 115 is applied to control algorithm 116 which may then generate control values for operating the gas turbine assembly. The control values may be an IGV setting and/or a fuel setting that may be applied to adjust the IGVs of the main air compressor 12 and/or the turbine compressor 30 and/or to the gas control valve 27.

As an example, if it were desired to control the concentration of oxygen in the recirculated gas flow stream 50, then the measurement of oxygen present in the recirculated gas flow stream 50 may be used within the control system to control either the gas fuel flow or the combustion air flow, or both, to modify the fuel-to-air ratio within the turbine combustor 32. It is well known in the art that increasing the fuel-to-air ratio above the stoichiometric point will reduce the oxygen concentration in the recirculated gas flow stream 50, and vice versa. This relationship would be incorporated into the control algorithm 116 for the IGV and the gas control valve 27 (GCV) systems and may be realized using standard control algorithms such as but not limited to, a proportional-integral (PI) or proportional-integral-derivative (PID) controller.

In some embodiments, the first emission sensor 51 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the recirculated gas flow 50.

Figure 3:
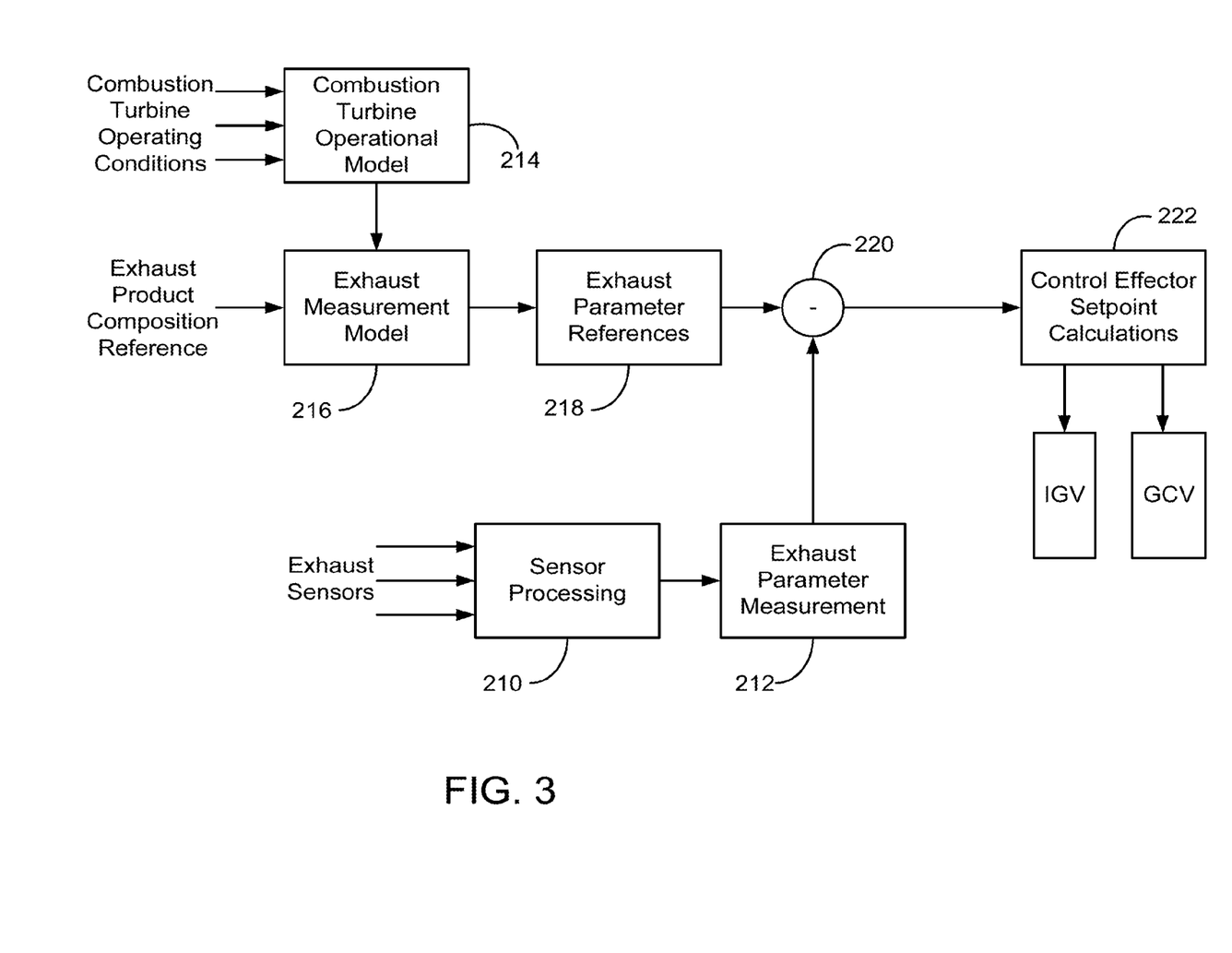
FIG. 3 is a high-level block diagram of an indirect model based exhaust product control method in accordance with an embodiment of the present invention.

FIG. 3 shows a high-level block diagram of an indirect model based exhaust product control method. One or more exhaust sensors provide input to an indirect sensor processing unit 210 which produces an exhaust parameter measurement 212. The combustion turbine operating conditions, perhaps obtained using additional sensors, including but not necessarily limited to, fuel flow, fuel temperature, IGV position, compressor inlet airflow, compressor discharge temperature, compressor discharge pressure, ambient temperature, ambient pressure, ambient humidity, and turbine shaft speed, are inputted to a combustion turbine operational model 214. An exhaust measurement model 216 receives input from both an exhaust product composition reference and the combustion turbine operational model 214 to produce an exhaust parameter reference 218. The exhaust parameter measurement 212 is compared to the corresponding exhaust parameter reference 218 to generate an indirect difference signal 220. The indirect difference signal 220 is applied to the indirect control algorithm 222 which may then generate control values for operating the gas turbine assembly. The control values may be an IGV setting and fuel setting that may be applied to adjust the IGVs of the main air compressor 12 and/or the turbine compressor 30 and/or to the gas control valve 27.

As an example, if it were desired to indirectly control the concentration of carbon monoxide (CO) in the exhaust stream, then knowledge of the relationship between exhaust temperature and the CO concentration in the recirculated gas flow steam 50 may be used to develop an indirect control method. In this situation, the exhaust measurement model 216 may utilize this relationship so that the exhaust parameter reference signal, together with additional information from the combustion turbine operational model 214, might be used to generate a corresponding exhaust parameter reference 218. The difference between the exhaust parameter reference 218 and the exhaust temperature measured by the indirect sensor processing unit 210 as computed as an indirect difference signal 220, may then be used by well-known means to adjust either the air flow using the IGVs or the fuel flow using the GCV, or both, to indirectly control the CO concentration. In this case the indirect control algorithm 222 for the IGV and GCV systems may be realized using standard control algorithms such as but not limited to, a proportional-integral (PI) or proportional-integral-derivative (PID) controller.

In some embodiments, a second emission sensor 53 may be used to measure at least a second emission level in the recirculated gas flow 50. In some embodiments, the at least a second emission level measured by the second emission sensor 53 may be used to generate at least a second control signal. The second emission sensor 53 may be connected to the controller, and the controller may be used to process the at least a second control signal. In some embodiments, the at least a second control signal may be used to adjust the compressed ambient gas flow rate into the turbine combustor 32. In some embodiments, the step of adjusting the compressed ambient gas flow rate may comprise adjusting a plurality of IGVs of the main air compressor 12. In other embodiments, the at least a second control signal may be used to adjust a plurality of IGVs of the turbine compressor 30.

In some embodiments, the second emission sensor 53 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the recirculated gas flow 50 and provide direct signals of same to the control system.

In some embodiments, the second emission sensor 53 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the recirculated gas flow 50.

As used herein, the term "recirculated gas flow" refers to the gas flow generated by the burning of the combustible mixture in the turbine combustor 32 and flowing through a recirculation loop 52. In some embodiments, the recirculated gas flow may be a low oxygen content recirculated gas flow. The term "low oxygen content" refers to an oxygen content of below about 5 vol %, below about 2 vol %, or below about 1 vol %.

As used herein, the term "gas turbine assembly" refers to all listed components of the power plant arrangements except for the main air compressor 12. In embodiments comprising multiple main air compressors, the term "gas turbine assembly" refers to all listed components of the power plant arrangements except for the multiple main air compressors.

In some embodiments, the recirculated gas flow 50 may be directed from the turbine 34 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated gas flow 50 may then be directed back into the recirculation loop 52 to a recirculated gas flow cooler 40. In still other embodiments, the recirculation loop 52 may not contain a heat recovery steam generator 36 and the recirculated gas flow 50 may instead be introduced directly into the recirculated gas flow cooler 40 upon exit from the turbine 34. In other embodiments, the recirculation loop 52 may not comprise the recirculated gas flow cooler 40.

The recirculated gas flow cooler 40 may be incorporated into the recirculation loop 52 anywhere downstream from the turbine 34. The recirculated gas flow cooler 40 may be configured to lower the temperature of the recirculated gas flow 50 to a suitable temperature for downstream delivery into the turbine compressor 30 via the recirculation loop 52. In some embodiments, a suitable temperature may be below about 66° C., below about 49° C., or below about 45° C.

In some embodiments, the gas turbine assembly may further comprise a secondary flow path 31 that delivers at least a second portion of the recirculated gas flow 50 from the turbine compressor 30 to the turbine 34 as a secondary flow. The secondary flow may be used to cool and to seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 downstream of the turbine 34.

In some embodiments, the exemplary power plant arrangement 10 may include a bypass conduit 49 located downstream of the turbine compressor 30 and may be in fluid connection with a portion of the recirculated gas flow 50 from the output of the turbine compressor 30. In some embodiments, a bypass flow through the bypass conduit 49 may be regulated by a turbine bypass valve 47. The turbine bypass valve 47 may be used to adjust a bypass flow rate through the bypass conduit 49. In some embodiments, the bypass flow may be fluidly connected to the recirculation loop 52 downstream of the turbine 34.

In some embodiments, at least a portion of the recirculated gas flow 50 from the output of the turbine compressor 30 may be extracted through an extraction conduit 48 which may be regulated by an extraction valve 45. In some embodiments, the extraction valve 45 may be fluidly connected to a bypass conduit 49 at a point that is either upstream of or downstream from a turbine bypass valve 47. In some embodiments, the extraction conduit 48 may be fluidly connected to a gas separation system such as a carbon capture sequestration (CCS) system. In still other embodiments, the gas separation system may produce a stream of concentrated carbon dioxide and concentrated nitrogen, both with a low oxygen content. In some embodiments, the extraction valve 45 may be adjusted to maintain a constant mass balance in the power plant arrangement 10. As used herein, the term "constant mass balance" means that the system inputs, including fuel and air, are balanced with the system outputs via extraction, including carbon dioxide, nitrogen, and water.

In some embodiments, a booster compressor 24 may be incorporated into the turbine compressor bypass conduit 26 downstream of and in fluid connection with the main air compressor 12 and upstream of and in fluid connection with the turbine combustor 32. The booster compressor 24 may further compress the at least a first portion of the compressed ambient gas flow before delivery into the turbine combustor 32. In some embodiments, the compressed ambient gas flow rate may be varied by adjusting the speed of the booster compressor 24 and/or the inlet guide vanes of the booster compressor 24.

In still other embodiments, a blower 42 may be fluidly connected to the recirculation loop 52 upstream of or downstream from the recirculated gas flow cooler 40. The blower 42 may be configured to increase the pressure of the recirculated gas flow 50 prior to delivery into the turbine compressor 30 via the recirculation loop 52.

In some embodiments, an exhaust port to the atmosphere may be in fluid communication with the gas turbine assembly and may be located anywhere between an output of the turbine compressor 30 and an input of the turbine compressor 30. In some embodiments, the power plant arrangement 10 may include a damper door 38 connected to the recirculation loop 52. The damper door 38 may be opened to vent a portion of the recirculated gas flow 50 to the atmosphere.

As illustrated by FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

As used herein, the term "slave" is synonymous with the terms secondary, auxiliary, or additional. In the following embodiments, the term "slave" refers to the second of two gas turbine assemblies, but can also mean any additional gas turbine assemblies operated with a main gas turbine assembly such as is the second gas turbine assembly in the following embodiments. Furthermore, the term "master train" is synonymous with a master gas turbine assembly, while the term "slave train" is synonymous with a slave gas turbine assembly.

Figure 4:
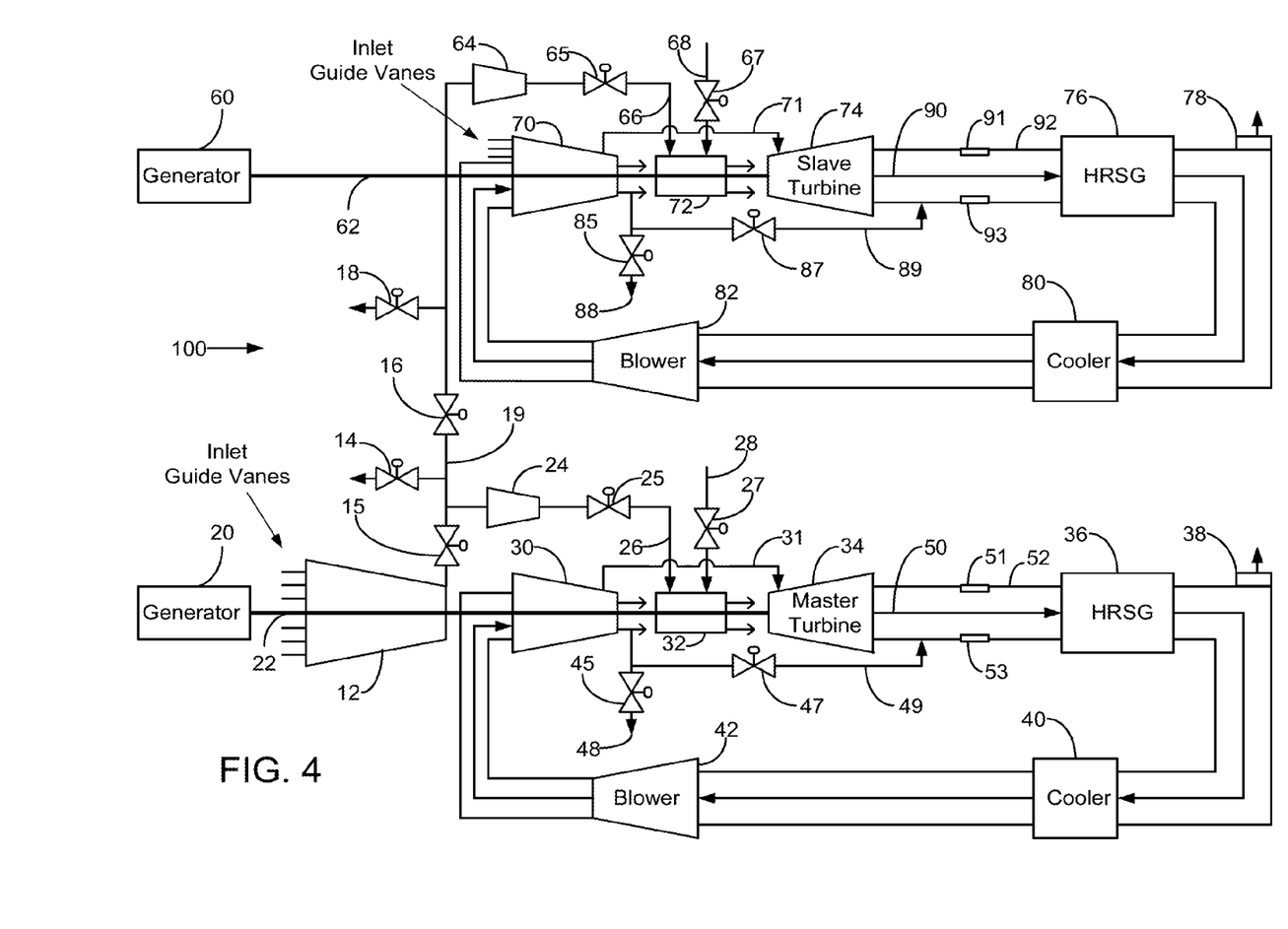
FIG. 4 is diagrammatical illustration of another exemplary power plant arrangement 100 in accordance with an embodiment of the present invention.

As illustrated in FIG. 4, in some embodiments, the main air compressor 12 may deliver compressed ambient gas via a slave turbine compressor bypass conduit 66 to a slave turbine combustor 72 that may be fluidly connected to the main air compressor 12 via an inter-train conduit 19. In some embodiments, the flow of the compressed ambient gas into the inter-train conduit 19 may be controlled by an air supply valve 15. The flow of the compressed ambient gas through the inter-train conduit 19 may be further regulated by an inter-train valve 16 to create at least a second portion of a compressed ambient gas flow. In some embodiments, the at least a second portion of the compressed ambient gas flow may be vented to the atmosphere via a slave variable bleed valve 18. In some embodiments, the flow of the at least a second portion of the compressed ambient gas flow to a slave turbine combustor 72 may be regulated by a slave air injection valve 65 to deliver the at least a second portion of the compressed ambient gas flow with a slave compressed ambient gas flow rate.

An excess portion, if any, of the at least a second portion of the compressed ambient gas flow may be vented to the atmosphere via a slave variable bleed valve 18. Such venting may be necessary, for instance, to prevent an overflow of air into the slave turbine compressor 72 or to prevent a buildup of backpressure into the main air compressor 12, thereby preventing a surge.

The slave turbine combustor 72 may be configured to receive the at least a second portion of the compressed ambient gas flow from the main air compressor 12, a slave recirculated gas flow 90 from a slave turbine compressor 70, and a slave fuel stream 68, to form a slave combustible mixture and to burn the slave combustible mixture to generate the slave recirculated gas flow 90. In some embodiments, the slave fuel stream 68 may be regulated by a slave gas control valve 67 to regulate a slave fuel stream flow rate. In addition, the exemplary power plant arrangement 100 may include a slave turbine 74 located downstream of the slave turbine combustor 72. The slave turbine 74 may be configured to expand the slave recirculated gas flow 90 and may drive an external load such as a slave turbine generator 60 via a slave turbine shaft 62 to generate electricity.

In some embodiments, the slave turbine compressor 70 may further comprise adjustable IGVs to control the flow of air into the slave turbine compressor 70.

The gas turbine assembly 100 may be comprise sensors and may be controlled by a controller, as described above. The master train of the gas turbine assembly 100 may further comprise one or more emission sensors in the recirculation loop 52, as described above.

The gas turbine assembly 100 may further comprise one or more emission sensors in the slave recirculation loop 92. In some embodiments, a first slave emission sensor 91 may be used to measure at least a first slave emission level in the slave recirculated gas flow 90. In some embodiments, the at least a first slave emission level measured by the first slave emission sensor 91 may be used to generate at least a first slave control signal. The first slave emission sensor 91 may be connected to the slave controller, and the slave controller may be used to process the at least a first slave control signal. The slave fuel stream flow rate may then be adjusted based on the at least a first slave control signal to achieve substantially stoichiometric combustion. In some embodiments, the slave fuel stream flow rate may be adjusted using the slave gas control valve 67.

In some embodiments, the at least a first slave control signal may be used to adjust the slave compressed ambient gas flow rate into the slave turbine combustor 72. In some embodiments, the step of adjusting the compressed ambient gas flow rate may comprise adjusting a plurality of IGVs of the main air compressor 12. In other embodiments, the at least a first slave control signal may be used to adjust a plurality of IGVs of the slave turbine compressor 70.

In some embodiments, the first slave emission sensor 91 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the slave recirculated gas flow 90 and provide direct signals of same to the control system.

In some embodiments, the first slave emission sensor 91 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the slave recirculated gas flow 90.

In some embodiments, a second slave emission sensor 93 may be used to measure at least a second slave emission level in the slave recirculated gas flow 90. In some embodiments, the at least a second slave emission level measured by the second slave emission sensor 93 may be used to generate at least a second slave control signal. The second slave emission sensor 93 may be connected to the slave controller, and the slave controller may be used to process the at least a second slave control signal. In some embodiments, the at least a second slave control signal may be used to adjust the slave compressed ambient gas flow rate into the slave turbine combustor 72. In some embodiments, the step of adjusting the slave compressed ambient gas flow rate may comprise adjusting a plurality of IGVs of the main air compressor 12. In other embodiments, the at least a second slave control signal may be used to adjust a plurality of IGVs of the slave turbine compressor 70.

In some embodiments, the second slave emission sensor 93 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the slave recirculated gas flow 90 and provide direct signals of same to the control system.

In some embodiments, the second slave emission sensor 93 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the slave recirculated gas flow 90.

As used herein, the term "slave recirculated gas flow" refers to the gas flow generated by burning of the slave combustible mixture in the slave turbine combustor 72 and flowing through a slave recirculation loop 92. In some embodiments, the slave recirculated gas flow 90 may be a low oxygen content gas flow. As used herein, the term "low oxygen content" refers to an oxygen content of below about 5 vol %, below about 2 vol %, or below about 1 vol %.

In some embodiments, at least a portion of the slave recirculated gas flow 90 from the output of the slave turbine compressor 70 may be extracted through a slave extraction conduit 88 which may be regulated by a slave extraction valve 85. In some embodiments, the slave extraction valve 85 may be fluidly connected to the slave bypass conduit 89 at a point that is either upstream of or downstream from the slave turbine bypass valve 87. In some embodiments, the slave extraction conduit 88 may be fluidly connected to a slave gas separation system such as a carbon capture sequestration (CCS) system. In still other embodiments, the slave gas separation system may produce a stream of concentrated carbon dioxide and concentrated nitrogen, both with a low oxygen content. In some embodiments, the slave extraction valve 85 may be adjusted to maintain a constant mass balance in the power plant arrangement 100. As used herein, the term "constant mass balance" means that the system inputs, including fuel and air, are balanced with the system outputs via extraction, including carbon dioxide, nitrogen, and water.

In some embodiments, the gas turbine assembly may further comprise a slave secondary flow path 71 that may deliver a portion of the slave recirculated gas flow 90 from the slave turbine compressor 70 to the slave turbine 74 as a slave secondary flow. The slave secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the slave recirculated gas flow 90 may be directed from the slave turbine combustor 72 through the slave recirculation loop 92 to a slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave heat recovery steam generator 76 may be configured to generate additional electricity when the temperature of the slave recirculated gas flow 90 is in the range from about 200° C. to about 700° C., from about 260° C. to about 600° C., or from about 300° C. to about 550° C. In some embodiments, the slave steam turbine may be arranged to be connected to the slave turbine shaft 62. The slave recirculated gas flow 90 may then be directed back into the slave recirculation loop 92 to a slave recirculated gas flow cooler 80. In still other embodiments, the recirculation loop 92 may not contain a slave heat recovery steam generator 76 and the slave recirculated gas flow 90 may instead be introduced directly into the slave recirculated gas flow cooler 80 upon exit from the slave turbine 74. In other embodiments, the slave recirculation loop 92 may not comprise the slave recirculated gas flow cooler 80.

The slave recirculated gas flow cooler 80 may be incorporated into the slave recirculation loop 92 anywhere downstream of the slave turbine 74. The slave recirculated gas flow cooler 80 may be configured to lower the temperature of the slave recirculated gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, the exemplary power plant arrangement 100 may include a slave bypass conduit 89 located downstream from the slave turbine compressor 70 and may be in fluid connection with a portion of the slave recirculated gas flow 90 from the output of the slave turbine compressor 70. In some embodiments, a slave bypass flow through the slave bypass conduit 89 may be regulated by a slave turbine bypass valve 87. The slave turbine bypass valve 87 may be used to adjust a slave bypass flow rate through the slave bypass conduit 89. In some embodiments, the slave bypass flow may be fluidly connected to the slave recirculation loop 92 downstream of the slave turbine 74.

In some embodiments, a slave booster compressor 64 may be incorporated into the slave turbine compressor bypass conduit 66 downstream of and in fluid connection with the main air compressor 12 and upstream of and in fluid connection with the slave turbine combustor 72. The slave booster compressor 64 may further compress the at least a second portion of the compressed ambient gas flow before delivery into the slave turbine combustor 72. In some embodiments, the slave compressed ambient gas flow rate may be varied by adjusting the speed of the slave booster compressor 64 and/or by adjusting the inlet guide vanes of the slave booster compressor 64.

In some embodiments, a slave blower 82 may be fluidly connected to the slave recirculation loop 92 upstream of or downstream from the slave recirculated gas flow cooler 80. The slave blower 82 may be configured to increase the pressure of the slave recirculated gas flow 90 prior to delivery into the slave turbine compressor 70 via the slave recirculation loop 92.

In some embodiments, a slave exhaust port to the atmosphere may be in fluid communication with the slave train and may be located anywhere between an output of the slave turbine compressor 70 and an input of the slave turbine compressor 70. In some embodiments, the exemplary power plant arrangement 100 may include a slave damper door 78 connected to the slave recirculation loop 92. The slave damper door 78 may be opened to vent a portion of the slave recirculated gas flow 90 to the atmosphere.

As illustrated by FIG. 4, in some embodiments, the slave turbine shaft 62 may be a "cold-end drive" configuration, meaning the slave turbine shaft 62 may connect to the slave turbine generator 60 at the compressor end of the salve turbine assembly. In other embodiments, the slave turbine shaft 62 may be a "hot-end drive" configuration, meaning the slave turbine shaft 62 may connect to the slave turbine generator 60 at the turbine end of the slave turbine assembly.

In some embodiments, the power plant arrangement comprises one gas turbine assembly. In other embodiments, the power plant arrangement comprises two or more gas turbine assemblies that are fluidly connected by an inter-train conduit 19. As used herein, the term "inter-train conduit" may refer to a fluid connection between two or more gas turbine assemblies and one or more main air compressors. In still other embodiments, the power plant arrangement comprises three or more gas turbine assemblies and one or more additional main air compressors, wherein the additional main air compressors are in fluid connection with each other and with the gas turbine assemblies. In some embodiments, the power plant is controllable to operate substantially stoichiometrically, meaning that the power plant arrangement is configured for substantially stoichiometric combustion. In still other embodiments, the power plant arrangement may be configured for substantially zero emissions power production.

In some embodiments, the master fuel stream 28 and/or the slave fuel stream 68 may comprise an organic gas, including but not limited to methane, propane, and/or butane. In still other embodiments, the master fuel stream 28 and/or the slave fuel stream 68 may comprise an organic liquid, including but not limited to methanol and/or ethanol. In yet other embodiments, the master fuel stream 28 and/or the slave fuel stream 68 may comprise a fuel source obtained from a solid carbonaceous material such as coal.

Control Method

In operation, a method for controlling a stoichiometric exhaust gas recirculation power plant arrangement 10 is provided, wherein ambient air is compressed using a main air compressor 12 to form at least a first portion of a compressed ambient gas flow. An excess portion, if any, of the at least a first portion of the compressed ambient gas flow may be vented to the atmosphere via a variable bleed valve 14.

At least a first portion of the compressed ambient gas flow, having a compressed ambient gas flow rate, may be delivered to a turbine combustor 32 that is fluidly connected to the main air compressor 12 via a turbine compressor bypass conduit 26. A fuel stream 28, having a fuel stream flow rate, may also be delivered to the turbine combustor 32. The at least a first portion of the compressed ambient gas flow may then be mixed with at least a first portion of a recirculated gas flow 50 and the fuel stream 28 to form a combustible mixture. The combustible mixture may be burned in the turbine combustor 32 to produce the recirculated gas flow 50. In some embodiments, the fuel stream flow rate may be controlled by a gas control valve 27.

A turbine 34 may be driven using the recirculated gas flow 50, thereby causing the turbine 34 to rotate. As used herein, the term "driven using the recirculated low oxygen content gas flow" means the recirculated gas flow 50 expands upon exit from the turbine combustor 32 and upon entrance into the turbine 34, thereby causing the turbine 34 to rotate.

The rotation of the turbine 34 may cause the turbine shaft 22 and also the turbine compressor 30 to rotate. The turbine shaft 22 may rotate in a turbine generator 20, such that rotation of the turbine shaft 22 may cause the turbine generator 20 to generate electricity. In embodiments, the turbine compressor 30 may be fluidly connected to the turbine combustor 32 such that the turbine compressor 30 may compress and deliver the recirculated gas flow 50 to the turbine combustor 32.

The gas turbine assembly may further comprise one or more emission sensors in the recirculation loop 52. In some embodiments, a first emission sensor 51 may be used to measure at least a first emission level in the recirculated gas flow 50. In some embodiments, the at least a first emission level measured by the first emission sensor 51 may be used to generate at least a first control signal. The first emission sensor 51 may be connected to the controller, and the controller may be used to process the at least a first control signal. The fuel stream flow rate may then be adjusted based on the at least a first control signal to achieve substantially stoichiometric combustion. In some embodiments, the fuel stream flow rate may be adjusted using the gas control valve 27.

In some embodiments, the at least a first control signal may be used to adjust the compressed ambient gas flow rate into the turbine combustor 32. In some embodiments, the step of adjusting the compressed ambient gas flow rate may comprise adjusting a plurality of IGVs of the main air compressor 12. In other embodiments, the at least a first control signal may be used to adjust a plurality of IGVs of the turbine compressor 30.

In some embodiments, the first emission sensor 51 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the recirculated gas flow 50 and provide direct signals of same to the control system.

In some embodiments, the first emission sensor 51 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the recirculated gas flow 50.

In some embodiments, a second emission sensor 53 may be used to measure at least a second emission level in the recirculated gas flow 50. In some embodiments, the at least a second emission level measured by the second emission sensor 53 may be used to generate at least a second control signal. The second emission sensor 53 may be connected to the controller, and the controller may be used to process the at least a second control signal. In some embodiments, the at least a second control signal may be used to adjust the compressed ambient gas flow rate into the turbine combustor 32. In some embodiments, the step of adjusting the compressed ambient gas flow rate may comprise adjusting a plurality of IGVs of the main air compressor 12. In other embodiments, the at least a second control signal may be used to adjust a plurality of IGVs of the turbine compressor 30.

In some embodiments, the second emission sensor 53 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the recirculated gas flow 50 and provide direct signals of same to the control system.

In some embodiments, the second emission sensor 53 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the recirculated gas flow 50.

The compressed ambient gas flow rate and/or the fuel stream flow rate may be adjusted to achieve substantially stoichiometric combustion. As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %. In some embodiments, the compressed ambient gas flow rate and/or the fuel stream flow rate may be adjusted based on measurements of oxygen and/or carbon dioxide present in the exhaust of the turbine 34 and/or in the recirculated gas flow 50.

In some embodiments, the main air compressor 12 may further comprise adjustable IGVs to control the flow of air into the main air compressor 12. The IGVs of the main air compressor may be used to regulate the compressed ambient gas flow rate that is delivered to the turbine combustor 32. In some embodiments, the turbine compressor 30 may further comprise adjustable IGVs to control the flow of air into the turbine compressor 30.

As illustrated in FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

As used herein, the term "recirculated gas flow" refers to the gas flow generated by the burning of the combustible mixture in the turbine combustor 32 and flowing through a recirculation loop 52. In some embodiments, the recirculated gas flow 50 is a low oxygen content gas flow. The term "low oxygen content" refers to an oxygen content of below about 5 vol %, below about 2 vol %, or below about 1 vol %.

In some embodiments, the recirculated gas flow 50 may be directed from the turbine 34 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated gas flow 50 may then be directed back into the recirculation loop 52 to a recirculated gas flow cooler 40. In still other embodiments, the recirculation loop 52 may not contain a heat recovery steam generator 36 and the recirculated gas flow 50 may instead be introduced directly into the recirculated gas flow cooler 40 upon exit from the turbine 34. In other embodiments, the recirculation loop 52 may not comprise the recirculated gas flow cooler 40.

The recirculated gas flow cooler 40 may be incorporated into the recirculation loop 52 anywhere downstream from the turbine 34. The recirculated gas flow cooler 40 may be configured to lower the temperature of the recirculated gas flow 50 to a suitable temperature for downstream delivery into the turbine compressor 30 via the recirculation loop 52. In some embodiments, a suitable temperature may be below about 66° C., below about 49° C., or below about 45° C.

In some embodiments, at least a portion of the recirculated gas flow 50 may be delivered from the turbine compressor 30 to the turbine 34 as a secondary flow. The gas turbine assembly may further comprise a secondary flow path 31 that delivers at least a second portion of the recirculated low oxygen content gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments, at least a portion of the recirculated gas flow 50 from the output of the turbine compressor 30 may be extracted through an extraction conduit 48 which may be regulated by an extraction valve 45. In some embodiments, the extraction valve 45 may be fluidly connected to a bypass conduit 49 at a point that is either upstream of or downstream of a turbine bypass valve 47. In some embodiments, the extraction conduit 48 may be fluidly connected to a gas separation system such as a carbon capture sequestration (CCS) system. In still other embodiments, the gas separation system may produce a stream of concentrated carbon dioxide and concentrated nitrogen, both with a low oxygen content. In some embodiments, the extraction valve 45 may be adjusted to maintain a constant mass balance in the power plant arrangement 10. As used herein, the term "constant mass balance" means that the system inputs, including fuel and air, are balanced with the system outputs via extraction, including carbon dioxide, nitrogen, and water.

In some embodiments, the turbine combustor 32 may be bypassed with at least a portion of the recirculated gas flow 50 using a bypass conduit 49. The bypass conduit 49 may be located downstream of the turbine compressor 30 and may be in fluid connection with a portion of the recirculated gas flow 50 from the output of the turbine compressor 30. In some embodiments, a bypass flow through the bypass conduit 49 may be regulated by a turbine bypass valve 47. The turbine bypass valve 47 may be used to adjust a bypass flow rate through the bypass conduit 49. In some embodiments, the bypass flow may be fluidly connected to the recirculation loop 52 downstream of the turbine 34.

In some embodiments, the at least a first portion of the compressed ambient gas flow 26 may be further compressed prior to delivery into the turbine combustor 32. The at least a first portion of the compressed ambient gas flow 26 may be further compressed by a booster compressor 24. The booster compressor 24 may be incorporated downstream from and in fluid connection with the main air compressor 12 and upstream of an in fluid connection with the turbine combustor 32. In some embodiments, the compressed ambient gas flow rate may be varied by adjusting the speed of the booster compressor 24 and/or by adjusting the inlet guide vanes of the booster compressor 24.

In some embodiments, a blower 42 may be used to increase the pressure of the recirculated gas flow 50. The blower 42 may be fluidly connected to the recirculation loop 52 upstream of or downstream from the recirculated gas flow cooler 40. The blower 42 may be configured to increase the pressure of the recirculated gas flow 50 prior to delivery into the turbine compressor 30 via the recirculation loop 52.

In some embodiments, an excess portion, if any, of the recirculated gas flow 50 may be vented from the gas turbine assembly. The power plant arrangement 10 may include a damper door 38 connected to the recirculation loop 52. The damper door 38 may be opened to vent a portion of the recirculated low oxygen gas content flow 50 to the atmosphere.

Control Method for a Master Train and a Slave Train

As used herein, the term "master train" refers to any gas turbine assembly that also includes a main air compressor. As used herein, the term "slave train" refers to any gas turbine assembly that does not also include a main air compressor. Thus, any given slave train requires at least one master train for operation.

In an embodiment, a method for controlling at least one master train of a stoichiometric exhaust gas recirculation power plant arrangement 100 is provided, wherein ambient air is compressed using a main air compressor 12 to form at least a first portion of a compressed ambient gas flow 26. In some embodiments, an air supply valve 15 that fluidly connects the main air compressor 12 to an inter-train conduit 19 may be opened. In some embodiments, a master air injection valve 25 that fluidly connects the inter-train conduit 19 to a master turbine combustor 32 may be opened. An excess portion, if any, of the at least a first portion of the compressed ambient gas flow 26 may be vented to the atmosphere via a master variable bleed valve 14.

At least a first portion of the compressed ambient gas flow 26, having a master compressed ambient gas flow rate, may be delivered to a master turbine combustor 32 that is fluidly connected to the main air compressor 12. A master fuel stream 28, having a master fuel stream flow rate, may also be delivered to the master turbine combustor 32. The at least a first portion of the compressed ambient gas flow 26 may then be mixed with at least a first portion of a master recirculated gas flow 50 and the master fuel stream 28 to form a master combustible mixture. The master combustible mixture may be burned in the master turbine combustor 32 to produce the master recirculated gas flow 50. In some embodiments, the master fuel stream flow rate may be controlled by a master gas control valve 27.

A master turbine 34 may be driven using the master gas flow 50, thereby causing the master turbine 34 to rotate. As used herein, the term "driven using the master recirculated low oxygen content gas flow" means the master recirculated gas flow 50 expands upon exit from the master turbine combustor 32 and upon entrance into the master turbine 34, thereby causing the master turbine 34 to rotate.

The rotation of the master turbine 34 may cause the master turbine shaft 22 and also the master turbine compressor 30 to rotate. The master turbine shaft 22 may rotate in a master turbine generator 20, such that rotation of the master turbine shaft 22 may cause the master turbine generator 20 to generate electricity. In embodiments, the master turbine compressor 30 may be fluidly connected to the master turbine combustor 32 such that the master turbine compressor 30 may compress and deliver the master recirculated gas flow 50 to the master turbine combustor 32.

The master train may further comprise one or more master emission sensors in the master recirculation loop 52. In some embodiments, a first master emission sensor 51 may be used to measure at least a first master emission level in the master recirculated gas flow 50. In some embodiments, the at least a first master emission level measured by the first master emission sensor 51 may be used to generate at least a first master control signal. The first master emission sensor 51 may be connected to the master controller, and the master controller may be used to process the at least a first master control signal. The master fuel stream flow rate may then be adjusted based on the at least a first master control signal to achieve substantially stoichiometric combustion. In some embodiments, the master fuel stream flow rate may be adjusted using the master gas control valve 27.

In some embodiments, the at least a first master control signal may be used to adjust the master compressed ambient gas flow rate into the master turbine combustor 32. In some embodiments, the step of adjusting the master compressed ambient gas flow rate may comprise adjusting a plurality of IGVs of the main air compressor 12. In other embodiments, the at least a first master control signal may be used to adjust a plurality of IGVs of the master turbine compressor 30.

In some embodiments, the first master emission sensor 51 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the master recirculated gas flow 50 and provide direct signals of same to the control system.

In some embodiments, the first master emission sensor 51 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the master recirculated gas flow 50.

In some embodiments, a second master emission sensor 53 may be used to measure at least a second master emission level in the master recirculated gas flow 50. In some embodiments, the at least a second master emission level measured by the second master emission sensor 53 may be used to generate at least a second master control signal. The second master emission sensor 53 may be connected to the master controller, and the master controller may be used to process the at least a second master control signal. In some embodiments, the at least a second master control signal may be used to adjust the master compressed ambient gas flow rate into the master turbine combustor 32. In some embodiments, the step of adjusting the master compressed ambient gas flow rate may comprise adjusting a plurality of IGVs of the main air compressor 12. In other embodiments, the at least a second master control signal may be used to adjust a plurality of IGVs of the master turbine compressor 30.

In some embodiments, the second master emission sensor 53 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the master recirculated gas flow 50 and provide direct signals of same to the control system.

In some embodiments, the second master emission sensor 53 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the master recirculated gas flow 50.

The master compressed ambient gas flow rate and/or the master fuel stream flow rate may be adjusted to achieve substantially stoichiometric combustion. As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %. In some embodiments, the master compressed ambient gas flow rate and/or the master fuel stream flow rate may be adjusted based on measurements of oxygen and/or carbon dioxide present in the exhaust of the master turbine 34 and/or in the master recirculated low oxygen content gas flow 50.

The main air compressor 12 may further comprise adjustable IGVs to control the flow of air into the main air compressor 12. The IGVs of the main air compressor may be used to regulate the master compressed ambient gas flow rate that is delivered to the master turbine combustor 32. Additionally, the master turbine compressor 30 may further comprise adjustable IGVs to control the flow of air into the master turbine compressor 30.

As illustrated in FIG. 4, in some embodiments, the master turbine shaft 22 may be a "cold-end drive" configuration, meaning the master turbine shaft 22 may connect to the master turbine generator 20 at the compressor end of the turbine assembly. In other embodiments, the master turbine shaft 22 may be a "hot-end drive" configuration, meaning the master turbine shaft 22 may connect to the master turbine generator 20 at the master turbine end of the turbine assembly.

As used herein, the term "master recirculated gas flow" refers to the gas flow generated by the burning of the master combustible mixture in the master turbine combustor 32 and flowing through a master recirculation loop 52. In some embodiments, the master recirculated gas flow 50 may comprise a low oxygen content. The term "low oxygen content" refers to an oxygen content of below about 5 vol %, below about 2 vol %, or below about 1 vol %.

In some embodiments, the master recirculated gas flow 50 may be directed from the master turbine 34 through the master recirculation loop 52 to a master heat recovery steam generator 36 for the generation of steam. A master steam turbine may be configured to generate additional electricity using the steam from the master heat recovery steam generator 36, and the master steam turbine may be connected to a master steam generator. In some embodiments, the master steam turbine may be arranged to be connected to the master turbine shaft 22. The master recirculated gas flow 50 may then be directed back into the master recirculation loop 52 to a master recirculated gas flow cooler 40. In still other embodiments, the master recirculation loop 52 may not contain a master heat recovery steam generator 36 and the master recirculated gas flow 50 may instead be introduced directly into the master recirculated gas flow cooler 40 upon exit from the master turbine 34. In other embodiments, the master recirculation loop 52 may not comprise the master recirculated gas flow cooler 40.

The master recirculated gas flow cooler 40 may be incorporated into the master recirculation loop 52 anywhere downstream from the master turbine 34. The master recirculated gas flow cooler 40 may be configured to lower the temperature of the master recirculated gas flow 50 to a suitable temperature for downstream delivery into the master turbine compressor 30 via the master recirculation loop 52. In some embodiments, a suitable temperature may be below about 66° C., below about 49° C., or below about 45° C.

In some embodiments, at least a portion of the master recirculated gas flow 50 may be delivered from the master turbine compressor 30 to the master turbine 34 as a master secondary flow. The gas turbine assembly may further comprise a master secondary flow path 31 that delivers at least a third portion of the master recirculated gas flow 50 from the master turbine compressor 30 to the master turbine 34 as a master secondary flow. The master secondary flow may be used to cool and seal the master turbine 34, including individual components of the master turbine 34 such as the turbine shroud, the turbine nozzle, the turbine blade tip, the turbine bearing support housing, and the like. After cooling and sealing the master turbine 34 and any individual turbine components, the master secondary flow may be directed into the master recirculation loop 52 near the output of the master turbine 34.

In some embodiments, at least a portion of the master recirculated gas flow 50 from the output of the master turbine compressor 30 may be extracted through a master extraction conduit 48 which may be regulated by a master extraction valve 45. In some embodiments, the master extraction valve 45 may be fluidly connected to a master bypass conduit 49 at a point that is either upstream of or downstream of a master turbine bypass valve 47. In some embodiments, the master extraction conduit 48 may be fluidly connected to a master gas separation system such as a master carbon capture sequestration (CCS) system. In still other embodiments, the master gas separation system may produce a stream of concentrated carbon dioxide and concentrated nitrogen, both with a low oxygen content. In some embodiments, the master extraction valve 45 may be adjusted to maintain a constant mass balance in the master train of the power plant arrangement 100. As used herein, the term "constant mass balance" means that the system inputs, including fuel and air, are balanced with the system outputs via extraction, including carbon dioxide, nitrogen, and water.

In some embodiments, the master turbine combustor 32 may be bypassed with at least a portion of the master recirculated gas flow 50 using a master bypass conduit 49. The master bypass conduit 49 may be located downstream of the master turbine compressor 30 and may be in fluid connection with a portion of the master recirculated gas flow 50 from the output of the master turbine compressor 30. In some embodiments, a master bypass flow through the master bypass conduit 49 may be regulated by a master turbine bypass valve 47. The master turbine bypass valve 47 may be used to adjust a master bypass flow rate through the master bypass conduit 49. In some embodiments, the master bypass flow may be fluidly connected to the master recirculation loop 52 downstream of the master turbine 34.

In some embodiments, the at least a first portion of the compressed ambient gas flow 26 may be further compressed prior to delivery into the master turbine combustor 32. The at least a first portion of the compressed ambient gas flow 26 may be further compressed by a master booster compressor 24. The master booster compressor 24 may be incorporated downstream from and in fluid connection with the main air compressor 12 and upstream of an in fluid connection with the master turbine combustor 32. In some embodiments, the master compressed ambient gas flow rate may be varied by adjusting the speed of the master booster compressor 24 and/or by adjusting the inlet guide vanes of the master booster compressor 24.

In some embodiments, a master blower 42 may be used to increase the pressure of the master recirculated gas flow 50. The master blower 42 may be fluidly connected to the master recirculation loop 52 upstream of or downstream of the master recirculated gas flow cooler 40. The master blower 42 may be configured to increase the pressure of the master recirculated gas flow 50 prior to delivery into the master turbine compressor 30 via the master recirculation loop 52.

In some embodiments, an excess portion, if any, of the master recirculated gas flow 50 may be vented from the master train. The master train may include a master damper door 38 connected to the master recirculation loop 52. The master damper door 38 may be opened to vent a portion of the master recirculated gas flow 50 to the atmosphere.

In an embodiment, a method for controlling at least one slave train of a stoichiometric exhaust gas recirculation power plant arrangement 100 is provided. An inter-train valve 16 may be opened, fluidly connecting the slave train to the master train. Additionally, a slave air injection valve 65 may be opened to fluidly connect the inter-train conduit 19 to the slave turbine combustor 72. At least a second portion of the compressed ambient gas flow 66 may be delivered directly to a slave turbine combustor 72. An excess portion, if any, of the at least a second portion of the compressed ambient gas flow 66 may be vented to the atmosphere via a slave variable bleed valve 18.

At least a second portion of the compressed ambient gas flow 66, having a slave compressed ambient gas flow rate, may be delivered to a slave turbine combustor 72 that is fluidly connected to the main air compressor 12. A slave fuel stream 68, having a slave fuel stream flow rate, may also be delivered to the slave turbine combustor 72. The at least a second portion of the compressed ambient gas flow 66 may then be mixed with at least a first portion of a slave recirculated low oxygen content gas flow 90 and the slave fuel stream 68 to form a slave combustible mixture. The slave combustible mixture may be burned in the slave turbine combustor 72 to produce the slave recirculated low oxygen content gas flow 90. In some embodiments, the slave fuel stream flow rate may be controlled by a slave gas control valve 67.

A slave turbine 74 may be driven using the slave recirculated low oxygen content gas flow 90, thereby causing the slave turbine 74 to rotate. As used herein, the term "driven using the slave recirculated low oxygen content gas flow" means the slave recirculated low oxygen content gas flow 90 expands upon exit from the slave turbine combustor 72 and upon entrance into the slave turbine 74, thereby causing the slave turbine 74 to rotate.

The rotation of the slave turbine 74 may cause the slave turbine shaft 62 and also the slave turbine compressor 70 to rotate. The slave turbine shaft 62 may rotate in a slave turbine generator 60, such that rotation of the slave turbine shaft 62 may cause the slave turbine generator 60 to generate electricity. In embodiments, the slave turbine compressor 70 may be fluidly connected to the slave turbine combustor 72 such that the slave turbine compressor 70 may compress and deliver the slave recirculated low oxygen content gas flow 90 to the slave turbine combustor 72.

The slave train may further comprise one or more slave emission sensors in the slave recirculation loop 92. In some embodiments, a first slave emission sensor 91 may be used to measure at least a first slave emission level in the slave recirculated gas flow 90. In some embodiments, the at least a first slave emission level measured by the first slave emission sensor 91 may be used to generate at least a first slave control signal. The first slave emission sensor 91 may be connected to the slave controller, and the slave controller may be used to process the at least a first slave control signal. The slave fuel stream flow rate may then be adjusted based on the at least a first slave control signal to achieve substantially stoichiometric combustion. In some embodiments, the slave fuel stream flow rate may be adjusted using the slave gas control valve 67.

In some embodiments, the at least a first slave control signal may be used to adjust the slave compressed ambient gas flow rate into the slave turbine combustor 72. In some embodiments, the step of adjusting the slave compressed ambient gas flow rate may comprise adjusting a plurality of IGVs of the main air compressor 12. In other embodiments, the at least a first slave control signal may be used to adjust a plurality of IGVs of the slave turbine compressor 70.

In some embodiments, the first slave emission sensor 91 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the slave recirculated gas flow 90 and provide direct signals of same to the control system.

In some embodiments, the first slave emission sensor 91 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the slave recirculated gas flow 90.

In some embodiments, a second slave emission sensor 93 may be used to measure at least a second slave emission level in the slave recirculated gas flow 90. In some embodiments, the at least a second slave emission level measured by the second slave emission sensor 93 may be used to generate at least a second slave control signal. The second slave emission sensor 93 may be connected to the slave controller, and the slave controller may be used to process the at least a second slave control signal. In some embodiments, the at least a second slave control signal may be used to adjust the slave compressed ambient gas flow rate into the slave turbine combustor 72. In some embodiments, the step of adjusting the slave compressed ambient gas flow rate may comprise adjusting a plurality of IGVs of the main air compressor 12. In other embodiments, the at least a second slave control signal may be used to adjust a plurality of IGVs of the slave turbine compressor 70.

In some embodiments, the second slave emission sensor 93 may be a direct measurement sensor, examples of which include, but are not limited to, continuous emissions monitoring sensor (CEMS) systems, gas analyzers, gas chromatographs, lambda meters (oxygen sensors), tunable diode laser sensors, or zirconia oxygen analyzers. Such direct measurement sensors may directly measure the concentration of one or more constituents such as, but not limited to, NO (nitric oxide), $NO_2$ (nitrogen dioxide), CO (carbon monoxide), $CO_2$ (carbon dioxide), $O_2$ (oxygen) and/or $N_2$ (nitrogen) in the slave recirculated gas flow 90 and provide direct signals of same to the control system.

In some embodiments, the second slave emission sensor 93 may be an indirect measurement sensor, examples of which include, but are not limited to, thermocouples, pressure transmitters, flow sensors and humidity sensors. Indirect measurement sensors may provide one or more signals which may be used in conjunction with turbine system and exhaust measurement models in order to provide estimated reference signals for the turbine system exhaust, which may then be used to directly control the turbine system based on the exhaust parameters, in effect resulting in the indirect control of one or more constituents in the slave recirculated gas flow 90.

The slave compressed ambient gas flow rate and/or the slave fuel stream flow rate may be adjusted to achieve substantially stoichiometric combustion. As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %. In some embodiments, the slave compressed ambient gas flow rate and/or the slave fuel stream flow rate may be adjusted based on measurements of oxygen and/or carbon dioxide present in the exhaust of the slave turbine 74 and/or in the slave recirculated low oxygen content gas flow 90.

The slave turbine compressor 70 may further comprise adjustable IGVs to control the flow of air into the slave turbine compressor 70.

As illustrated in FIG. 4, in some embodiments, the slave turbine shaft 62 may be a "cold-end drive" configuration, meaning the slave turbine shaft 62 may connect to the slave turbine generator 60 at the compressor end of the slave train. In other embodiments, the slave turbine shaft 62 may be a "hot-end drive" configuration, meaning the slave turbine shaft 62 may connect to the slave turbine generator 60 at the slave turbine end of the slave train.

As used herein, the term "slave recirculated gas flow" refers to the gas flow generated by the burning of the slave combustible mixture in the slave turbine combustor 72 and flowing through a slave recirculation loop 92. In some embodiments, the slave recirculated gas flow 90 may comprise a low oxygen content. The term "low oxygen content" refers to an oxygen content of below about 5 vol %, below about 2 vol %, or below about 1 vol %.

In some embodiments, the slave recirculated gas flow 90 may be directed from the slave turbine 74 through the slave recirculation loop 92 to a slave heat recovery steam generator 76 for the generation of steam. A slave steam turbine may be configured to generate additional electricity using the steam from the slave heat recovery steam generator 76, and the slave steam turbine may be connected to a slave steam generator. In some embodiments, the slave steam turbine may be arranged to be connected to the slave turbine shaft 62. The slave recirculated gas flow 90 may then be directed back into the slave recirculation loop 92 to a slave recirculated gas flow cooler 80. In still other embodiments, the slave recirculation loop 92 may not contain a slave heat recovery steam generator 76 and the slave recirculated gas flow 90 may instead be introduced directly into the slave recirculated gas flow cooler 80 upon exit from the slave turbine 74. In other embodiments, the slave recirculation loop 92 may not comprise the slave recirculated gas flow cooler 80.

The slave recirculated gas flow cooler 80 may be incorporated into the slave recirculation loop 92 anywhere downstream from the slave turbine 74. The slave recirculated gas flow cooler 80 may be configured to lower the temperature of the slave recirculated gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, at least a portion of the slave recirculated gas flow 90 may be delivered from the slave turbine compressor 70 to the slave turbine 74 as a slave secondary flow. The slave train may further comprise a slave secondary flow path 71 that delivers at least a third portion of the slave recirculated gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, at least a portion of the slave recirculated gas flow 90 from the output of the slave turbine compressor 70 may be extracted through a slave extraction conduit 88 which may be regulated by a slave extraction valve 85. In some embodiments, the slave extraction valve 85 may be fluidly connected to a slave bypass conduit 89 at a point that is either upstream of or downstream of a slave turbine bypass valve 87. In some embodiments, the slave extraction conduit 88 may be fluidly connected to a slave gas separation system such as a slave carbon capture sequestration (CCS) system. In still other embodiments, the slave gas separation system may produce a stream of concentrated carbon dioxide and concentrated nitrogen, both with a low oxygen content. In some embodiments, the slave extraction valve 85 may be adjusted to maintain a constant mass balance in the slave train of the power plant arrangement 100. As used herein, the term "constant mass balance" means that the system inputs, including fuel and air, are balanced with the system outputs via extraction, including carbon dioxide, nitrogen, and water.

In some embodiments, the slave turbine combustor 72 may be bypassed with at least a portion of the slave recirculated gas flow 90 using a slave bypass conduit 89. The slave bypass conduit 89 may be located downstream of the slave turbine compressor 70 and may be in fluid connection with a portion of the slave recirculated gas flow 90 from the output of the slave turbine compressor 70. In some embodiments, a slave bypass flow through the slave bypass conduit 89 may be regulated by a slave turbine bypass valve 87. The slave turbine bypass valve 87 may be used to adjust a slave bypass flow rate through the slave bypass conduit 89. In some embodiments, the slave bypass flow may be fluidly connected to the slave recirculation loop 92 downstream of the slave turbine 74.

In some embodiments, the at least a second portion of the compressed ambient gas flow 66 may be further compressed prior to delivery into the slave turbine combustor 72. The at least a second portion of the compressed ambient gas flow 66 may be further compressed by a slave booster compressor 64. The slave booster compressor 64 may be incorporated downstream from and in fluid connection with the main air compressor 12 and upstream of an in fluid connection with the slave turbine combustor 72. In some embodiments, the slave compressed ambient gas flow rate may be varied by adjusting the speed of the slave booster compressor 64 and/or the inlet guide vanes of the slave booster compressor 64.

In some embodiments, a slave blower 82 may be used to increase the pressure of the slave recirculated gas flow 90. The slave blower 82 may be fluidly connected to the slave recirculation loop 92 upstream of or downstream from the slave recirculated gas flow cooler 80. The slave blower 82 may be configured to increase the pressure of the slave recirculated gas flow 90 prior to delivery into the slave turbine compressor 70 via the slave recirculation loop 92.

In some embodiments, an excess portion, if any, of the slave recirculated gas flow 90 may be vented from the slave train. The slave train may include a slave damper door 78 connected to the slave recirculation loop 92. The slave damper door 78 may be opened to vent a portion of the slave recirculated gas flow 90 to the atmosphere.

Other configurations and methods of operation are provided by U.S. patent applications including "Power Plant and Method of Operation" to Daniel Snook, Lisa Wichmann, Sam Draper, Noemie Dion Ouellet, and Scott Rittenhouse (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant Start-Up Method" to Daniel Snook, Lisa Wichmann, Sam Draper, Noemie Dion Ouellet, and Scott Rittenhouse (filed Aug. 25, 2011), "Power Plant and Method of Use" to Daniel Snook, Lisa Wichmann, Sam Draper, and Noemie Dion Ouellet (filed Aug. 25, 2011), "Power Plant and Method of Operation" to Predrag Popovic (filed Aug. 25, 2011), "Power Plant and Method of Operation" to Sam Draper and Kenneth Kohl (filed Aug. 25, 2011), "Power Plant and Method of Operation" to Sam Draper (filed Aug. 25, 2011), "Power Plant and Method of Operation" to Sam Draper (filed Aug. 25, 2011), "Power Plant and Method of Operation" to Lisa Wichmann (filed Aug. 25, 2011), and "Power Plant and Control Method" to Daniel Snook, Lisa Wichmann, Sam Draper, and Noemie Dion Ouellet (filed Aug. 25, 2011), the disclosures of which are incorporated in full by reference herein.

It should be apparent that the foregoing relates only to the preferred embodiments of the present invention and that numerous changes and modifications may be made herein without departing from the spirit and the scope of the invention as defined by the following claims and equivalents thereof.

I claim:

1. A method for controlling a stoichiometric exhaust gas recirculation power plant arrangement, comprising the steps of:

compressing ambient air into a compressed ambient gas flow with at least one main air compressor;

delivering at least a first portion of the compressed ambient gas flow, with a compressed ambient gas flow rate, to a turbine combustor that is fluidly connected to the at least one main air compressor via a turbine compressor bypass conduit;

delivering a fuel stream, having a fuel stream flow rate, to the turbine combustor for mixing with the at least a first portion of the compressed ambient gas flow and with at least a first portion of a recirculated gas flow to form a combustible mixture;

burning the combustible mixture in the turbine combustor and thereby forming the recirculated gas flow and driving a turbine connected to a turbine compressor via a turbine shaft;

recirculating the recirculated gas flow from the turbine to the turbine compressor using a recirculation loop;

measuring at least one emission level by at least a first emission sensor in the recirculated gas flow;

using the at least one emission level measured by the at least a first emission sensor to generate at least a first control signal; and adjusting the fuel stream flow rate based on the at least a first control signal to achieve substantially stoichiometric combustion.

2. The method of claim 1, further comprising delivering a secondary flow through a secondary flow path, wherein the secondary flow path delivers at least a second portion of the recirculated gas flow from the turbine compressor to the turbine for cooling and sealing the turbine and thereafter into the recirculation loop.

3. The method of claim 1, wherein the step of adjusting the fuel stream flow rate further comprises adjusting one or more gas control valves.

4. The method of claim 1, further comprising adjusting the compressed ambient gas flow rate based on the at least a first control signal.

5. The method of claim 4, wherein the step of adjusting the compressed ambient gas flow rate further comprises adjusting a plurality of inlet guide vanes of the at least one main air compressor.

6. The method of claim 1, further comprising measuring at least a second emission level by at least a second emission sensor in the recirculated gas flow and using the at least a second emission level measured by the at least a second emission sensor to generate at least a second control signal.

7. The method of claim 6, further comprising adjusting the compressed ambient gas flow rate based on the at least a second control signal.

8. A method for controlling at least one master train of a stoichiometric exhaust gas recirculation power plant arrangement, comprising the steps of:

compressing ambient air into a compressed ambient gas flow with at least one main air compressor;

delivering at least a first portion of the compressed ambient gas flow, with a master compressed ambient gas flow rate, to a master turbine combustor that is fluidly connected to the at least one main air compressor via a master turbine compressor bypass conduit;

delivering a master fuel stream, having a master fuel stream flow rate, to the master turbine combustor for mixing with the at least a first portion of the compressed ambient gas flow and with at least a first portion of a master recirculated gas flow to form a master combustible mixture;

burning the master combustible mixture in the master turbine combustor and thereby forming the master recirculated gas flow and driving a master turbine connected to a master turbine compressor via a master turbine shaft;

recirculating the master recirculated gas flow from the master turbine to the master turbine compressor using a master recirculation loop;

measuring at least one master emission level by at least a first master emission sensor in the master recirculated gas flow;

using the at least one master emission level measured by the at least a first master emission sensor to generate at least a first master control signal; and adjusting the master fuel stream flow rate based on the at least a first master control signal to achieve substantially stoichiometric combustion.

9. The method of claim 8, further comprising delivering a master secondary flow through a master secondary flow path, wherein the master secondary flow path delivers at least a second portion of the master recirculated gas flow from the master turbine compressor to the master turbine for cooling and sealing the master turbine and thereafter into the master recirculation loop.

10. The method of claim 8, wherein the step of adjusting the master fuel stream flow rate further comprises adjusting one or more master gas control valves.

11. The method of claim 8, further comprising adjusting the compressed ambient gas flow rate based on the at least a first master control signal.

12. The method of claim 11, wherein the step of adjusting the compressed ambient gas flow rate further comprises adjusting a plurality of inlet guide vanes of the at least one main air compressor.

13. The method of claim 8, further comprising measuring at least a second master emission level by at least a second master emission sensor in the master recirculated gas flow and using the at least a second master emission level measured by the at least a second master emission sensor to generate at least a second master control signal.

14. The method of claim 13, further comprising adjusting the compressed ambient gas flow rate based on the at least a second master control signal.

15. The method of claim 8, further comprising controlling at least one slave train of a stoichiometric exhaust gas recirculation power plant arrangement, comprising the steps of:

delivering at least a second portion of the compressed ambient gas flow, with a slave compressed ambient gas flow rate, to a slave turbine combustor that is fluidly connected to the at least one main air compressor via a slave turbine compressor bypass conduit;

delivering a slave fuel stream, having a slave fuel stream flow rate, to the slave turbine combustor for mixing with the at least a second portion of the compressed ambient gas flow and with at least a first portion of a slave recirculated gas flow to form a slave combustible mixture;

burning the slave combustible mixture in the slave turbine combustor and thereby forming the slave recirculated gas flow and driving a slave turbine connected to a slave turbine compressor via a slave turbine shaft;

recirculating the slave recirculated gas flow from the slave turbine to the slave turbine compressor using a slave recirculation loop;

measuring at least one slave emission level by at least a first slave emission sensor in the slave recirculated gas flow;

using the at least one slave emission level measured by the at least a first slave emission sensor to generate at least a first slave control signal; and adjusting the slave fuel stream flow rate based on the at least a first slave control signal to achieve substantially stoichiometric combustion.

16. The method of claim 15, further comprising delivering a slave secondary flow through a slave secondary flow path, wherein the slave secondary flow path delivers at least a second portion of the slave recirculated gas flow from the slave turbine compressor to the slave turbine for cooling and sealing the slave turbine and thereafter into the slave recirculation loop.

17. The method of claim 15, wherein the step of adjusting the slave fuel stream flow rate further comprises adjusting one or more slave gas control valves.

18. The method of claim 15, further comprising adjusting a plurality of inlet guide vanes of the slave turbine compressor based on the at least a first slave control signal.

19. The method of claim 15, further comprising measuring at least a second slave emission level by at least a second slave emission sensor in the slave recirculated gas flow and using the at least a second slave emission level measured by the at least a second slave emission sensor to generate at least a second slave control signal.

20. A stoichiometric exhaust gas recirculation power plant arrangement, comprising:

at least one main air compressor for compressing ambient air into a compressed ambient gas flow; and one or more gas turbine assemblies, each comprising:
a turbine compressor bypass conduit;
a turbine combustor, fluidly connected to the at least one main air compressor via the turbine compressor bypass conduit, for mixing at least a first portion of the compressed ambient gas flow, having a compressed ambient gas flow rate, with at least a first portion of a recirculated gas flow and a fuel stream, having a fuel stream flow rate, to form a combustible mixture and for burning the combustible mixture and forming the recirculated gas flow;
a turbine connected to the turbine combustor and to a turbine shaft, and being arranged to be driven by the recirculated gas flow from the turbine combustor;
a turbine compressor, fluidly connected to the turbine combustor, and connected to the turbine shaft and being arranged to be driven thereby;
a recirculation loop for recirculating the recirculated gas flow from the turbine to the turbine compressor; and
a controller, configured to adjust the fuel stream flow rate to achieve substantially stoichiometric combustion, using at least a first control signal generated by a first emission sensor measuring at least one emission level in the recirculated gas flow.

* * * * *